L. A. CARPENTER & R. MIDDLETON.
PIPE HANGER.
APPLICATION FILED APR. 26, 1912.

1,063,852.

Patented June 3, 1913.

WITNESSES:
M. G. Crozier
J. Murphy

INVENTORS.
Lewis A. Carpenter
Richard Middleton
BY
Jas. H. Churchill
ATTORNEY.

UNITED STATES PATENT OFFICE.

LEWIS A. CARPENTER AND RICHARD MIDDLETON, OF REVERE, MASSACHUSETTS.

PIPE-HANGER.

1,063,852.  Specification of Letters Patent.  Patented June 3, 1913.

Application filed April 26, 1912.  Serial No. 693,304.

*To all whom it may concern:*

Be it known that we, LEWIS A. CARPENTER and RICHARD MIDDLETON, citizens of the United States, and both residing in Revere, county of Suffolk, and State of Massachusetts, have invented an Improvement in Pipe-Hangers, of which the following description, in connection with the accompanying drawings, is a specification, like letters on the drawings representing like parts.

This invention relates to a pipe hanger and has for its object to produce a light, strong and inexpensive hanger, which is capable of being made of thin galvanized iron and yet possess the strength desired.

To this end the hanger is composed essentially of three pieces, to wit, two pipe engaging members and a bell, with which one of the pipe engaging members is secured to form practically one piece, whereby a two piece hanger is obtained. The pipe engaging members are provided with substantially flat ears at their opposite ends, and between said ears with cupped or grooved portions which engage the pipe.

The particular features of the invention will be pointed out in the claims at the end of this specification.

Figure 1:
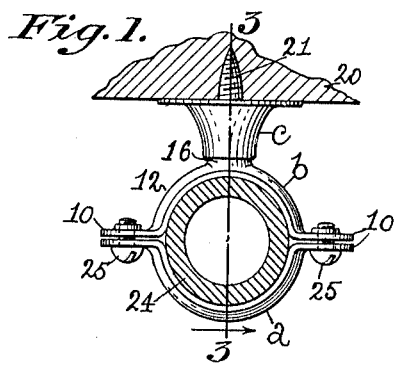
Figure 2:
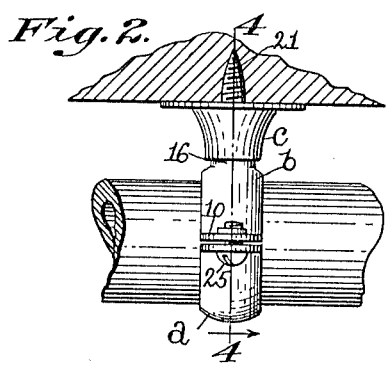
Figure 3:
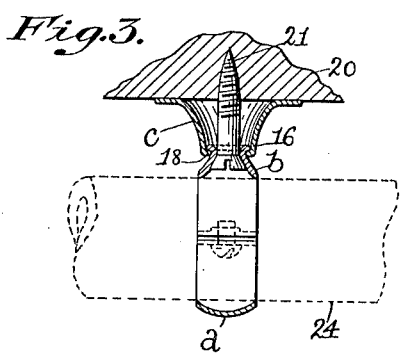
Figure 4:
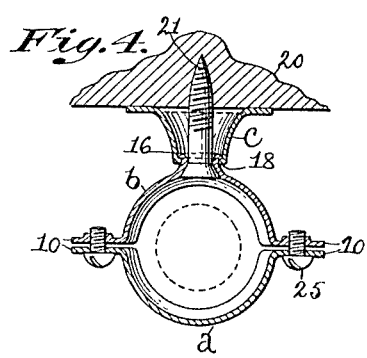
Figure 5:
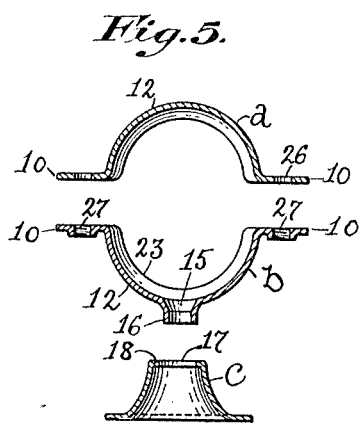

Figure 1 is an elevation of a pipe hanger embodying this invention, and applied to a pipe. Fig. 2, a side elevation of the hanger and pipe shown in Fig. 1. Fig. 3, a section on the line 3—3 Fig. 1. Fig. 4, a section on the line 4—4 Fig. 2, and Fig. 5, a view of the separate parts of the hanger.

The pipe hanger herein shown is made of sheet metal and particularly of galvanized sheet iron, and comprises pipe engaging members $a$, $b$, and a bell $c$. Each of the pipe engaging members $a$, $b$, is provided with substantially flat ears 10 and in intermediate curved or substantially semi-circular portion 12 which latter is cupped or curved transversely for its length to strengthen the same. One of the pipe engaging members as $b$ is fastened to the bell $c$, so as to form therewith practically one piece, and in the present instance the intermediate curved portion 12 is provided at its longitudinal center with a circular opening 15, whose walls 16 are elongated outwardly to form a nipple, which is extended into an opening 17 in the head 18 of the bell $c$, and then expanded outwardly to overlap the head 18 on its inner side and firmly secure the bell to the pipe engaging member $b$, so as to practically form one piece, which is capable of being handled as such, and secured to a ceiling, wall or other support 20 by a screw 21, extended through the openings 15, 17 in the member $b$ and bell $c$, into the said support, with the head of the screw below the contracting edges 23 of the said member. The member $a$ may be secured to the member $b$ after the pipe 24 has been placed in engagement with the member $b$, by screws 25, which are passed through holes 26 in the ears 10 of the member $a$ and into holes 27 in the ears 10 of the member $b$, the holes 27 having their walls elongated and threaded on their inner circumference to be engaged by the screws 25.

The hanger herein described is capable of being made from thin galvanized sheet iron, which enables it to be made very cheap, and the construction of the pipe engaging members with the flat ears and concaved pipe engaging portion, enables the hanger when made of thin galvanized iron to have the desired strength required to support the pipe.

The sheet metal bell serves as an ornamental base and also serves to reduce the cost, and by securing the bell to the member so as to form practically one piece, the cost of labor in applying the hanger to the pipe is materially lessened, all of which serves to enable the trade to be furnished with a galvanized sheet metal hanger of superior strength and more attractive appearance than the cheap but unsightly method of securing pipes in cellars and other parts of the household by means of a plain band of galvanized iron nailed to the ceiling or other support.

Claims:

1. A pipe hanger of the class described, comprising a sheet metal bell having a head provided with an opening, a sheet metal pipe engaging member having a concaved substantially semi-circular pipe engaging portion having an opening whose walls are extended outwardly to form a nipple which is extended through the opening in the head of the bell and expanded to engage said head and lock said member to said bell, and a second sheet metal pipe engaging member coöperating with the first mentioned member, substantially as described.

2. A pipe hanger of the class described, comprising a sheet metal bell, a sheet metal pipe-engaging member, one of said parts having an opening whose walls are extended outwardly to form a nipple which is extended into an opening in the other of said parts and expanded to lock the two parts together so as to enable them to be handled as one piece, and a second sheet metal pipe-engaging member coöperating with the first-mentioned member, substantially as described.

In testimony whereof, we have signed our names to this specification in the presence of two subscribing witnesses.

LEWIS A. CARPENTER.
RICHARD MIDDLETON.

Witnesses:
JAS. H. CHURCHILL,
J. MURPHY.

Copies of this patent may be obtained for five cents each, by addressing the "Commissioner of Patents, Washington, D. C."